Jan. 12, 1954     L. LORANT     2,666,168
MANUFACTURE AND CONSTRUCTION OF ELECTRICAL COILS
Filed Oct. 18, 1949     2 Sheets-Sheet 1
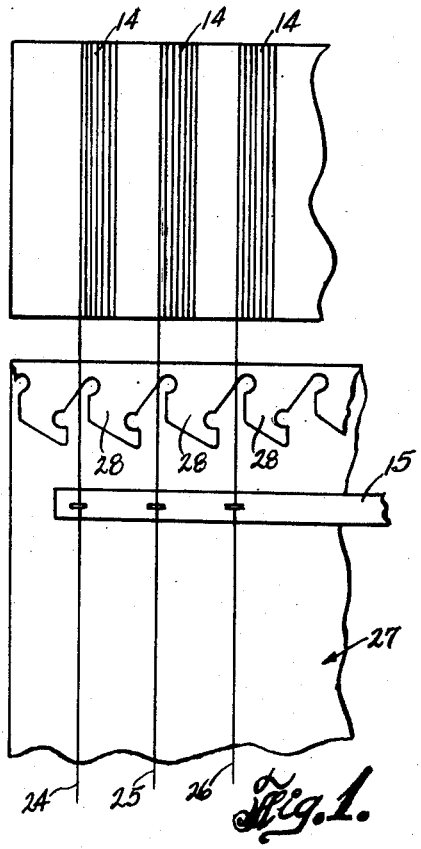
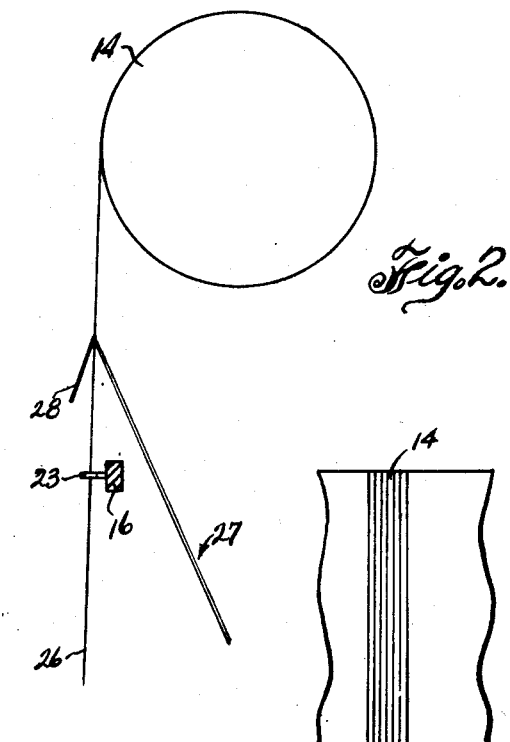
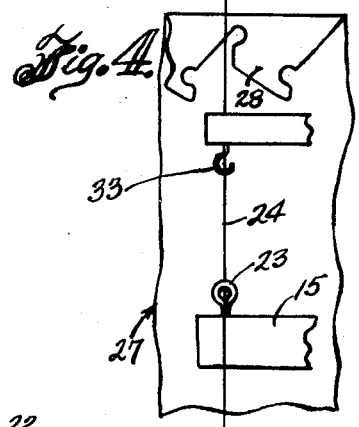
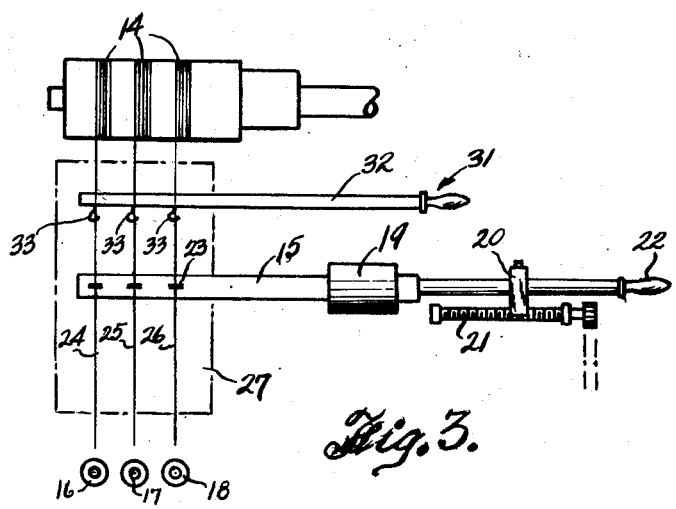
LIONEL LORANT,
INVENTOR.
By [signature]
ATTORNEY Jan. 12, 1954  L. LORANT  2,666,168
MANUFACTURE AND CONSTRUCTION OF ELECTRICAL COILS
Filed Oct. 18, 1949  2 Sheets-Sheet 2

LIONEL LORANT,
INVENTOR.
By
ATTORNEY

Patented Jan. 12, 1954

2,666,168

UNITED STATES PATENT OFFICE 2,666,168

MANUFACTURE AND CONSTRUCTION OF ELECTRICAL COILS

Lionel Lorant, Long Island City, N. Y., assignor to Super Electric Products Corp., Jersey City, N. J., a corporation of New Jersey Application October 18, 1949, Serial No. 122,020

3 Claims. (Cl. 317—222)

The present invention relates to the construction and manufacture of electrical coils of the type comprising successive layers of a plurality of turns of wire in each layer, with a dielectric sheet between layers; the entire coil being formed of a continuous wire, and more particularly where each layer is a closely wound helix. Of course, the teachings of this invention may be applied to other forms of coil structures.

It has been the practice to wind coils so that if one layer is wound for instance from right to left, that the next layer be wound from left to right, then the following layer from right to left again, and so on until the coil was fully wound. In coils so wound, the first turn of one layer is directly below the last turn of the succeeding layer, and the voltage difference between such turns would be twice the voltage difference between the first turns of said layers.

In the present invention, the coils are wound so that the first turns of the respective layers are over one another, or at least at one side of the coil structure, because if the first layer is wound from right to left, all the layers are so wound. Coils so wound, are the concern of this specification, because of the mentioned incident of lower voltage difference between adjacent turns of successive layers, and because coils so wound efficiently avoid what is known as distributed capacity in high frequency circuits.

In the making of these coils, after a layer is wound, the wire being led from the supply spool, is laid across said layer, to the position of the first turn of said layer. A sheet member of paper or other suitable dielectric material, is caused to be wrapped about the wound layer, and then the next lay of wire turns is wound, and the operation repeated until the coil is complete. Usually these coils are of easily bendable insulated wire, hair-like in size.

Heretofore, laying the wire across as mentioned, and holding it in required position, presented such difficulty, that coils of this character could never be produced commercially economically.

It is therefore an object of this invention to provide a novel and improved way for constructing a coil with this type of winding, so that same may be manufactured on a production basis at a reasonable cost. This is capable of accomplishment because of the use of a specially designed sheet member in accordance with the teachings of this invention, which sheet member is for insertion between successive layers of coil windings.

Since it is the sheet member taught herein, that has really solved the problem, it is another object of this invention to provide such novel and improved sheet member with means to easily mount the cross wire and hold same in proper position between coil layers.

Another object hereof is to provide an insert sheet member of the character and for the purposes mentioned, of novel and improved construction so that it shall serve not only to insulate successive coil layers, but it shall also insulate the cross wire between such layers, from each of said layers.

Another object hereof is to provide a sheet member of the character described, of novel and improved construction, which is cheap in cost, simple to mount on the coil being wound, easily adapted for all the manipulations and functions required of it and efficient in carrying out the purposes for which it is intended.

Other objects, purposes and advantages will become apparent as this disclosure proceeds.

In the accompanying drawings forming part of this specification, similar characters of reference indicate corresponding parts in all the views.

Fig. 1 is a fragmentary front view of a coil winding machine commonly used in the coil winding art, showing a completed layer of wire turns on each of a number of coils being simultaneously wound. This view contemplates the machine at rest and shows a paper or other suitable insulative sheet member as initially positioned for insertion between successive layers of windings in accordance with this invention. This paper insert is formed with a tab for each coil. Before the next layer of wire turns are wound on the respective coils, the wires being fed to the coils, are in a manner to be explained, respectively made to engage said tabs so as to properly position said wires being fed, to accomplish the purposes herein intended.

Fig. 2 is a side view of Fig. 1.

Fig. 3 is a fragmentary diagrammatic front view of the coil winding machine, and shows a hand tool suitable for use to mount the paper insert onto the wires being fed from the supply spools.

Fig. 4 is an enlarged portion of the showing of Fig. 3, partly in perspective.

Figure 5:
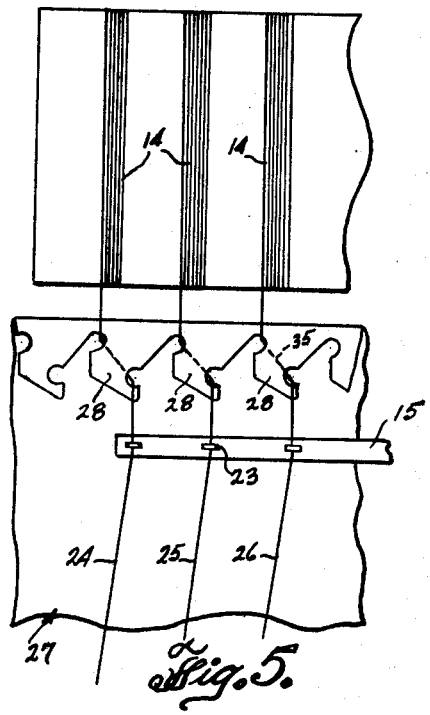
Fig. 5 is a view similar to Fig. 1, showing the wires being fed, mounted on the respective tabs of the sheet insert member.
Figure 6:
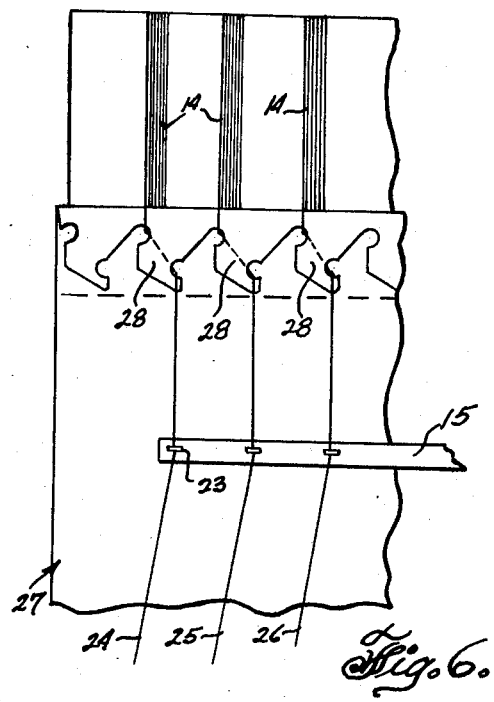
Fig. 6 is like Fig. 5, showing the commencement of winding of the next layer of turns. Here the machine is in operation and the wires are being wound as the first layer was, that is, from right to left, so that the first turn of the second layer is directly over the first turn of the first layer of turns.

In the drawings, the numeral 15 designates the traverse guide for the wires being supplied from the spools 16, 17 and 18, which wires are being wound to form electrical coils. Fig. 1 shows a completion of one layer 14 of wire turns on each of said coils on a winding machine as is usual in the art. Each of said layers, is in the form of a closely wound helix, shown wound from right to left. The traverse guide 15 is slidably mounted through bracket 19, and carries a swingable nut element 20 normally in engagement with a constantly rotating journalled screw shaft 21. This nut element or follower 20, may be manually swung out of engagement with the screw; whereupon motion of the traverse guide 15 will cease, and free said guide to be manually shifted by moving handle 22. The wires being fed to the coils, each lie through an eyelet 23, or other suitable wire guide means. The width of each layer is designated by the letter "A," and it is evident that layers being simultaneously wound, are of the same diameter. At the completion of each layer, a paper sheet of good insulative quality or other suitable sheet material is manually set to be between the wires 24, 25 and 26 being fed to the coils, and the last wound layer of each of the coils. Now upon resumption of the winding operation to form the next layer of wire turns on the respective coils, the paper insert will lie between two successive layers to insulate them from each other. The wires here used for coil winding, are hair-thin in size usually, easily bendable, and are insulatively coated.

The construction of the sheet insert as taught by the present invention, is shown designated by the numeral 27, as a preferred embodiment, because it is easy to make as a die-cut job, and is convenient to manipulate to mount the wires 24, 25 and 26 thereon in the manner required so that it serve efficiently for the purposes it is intended. The sheet is so bent and cut that a plurality of spaced tabs 28 are formed, extending downwardly from or near its top edge. In the respective sides of each tab, there is a cut-in, which may be a slit, or preferably a notch as illustrated. Each tab therefore is provided with the notches 29 and 30, and preferably the distance between notches 29 and 30 on each tab, should be as short as is possible and compatible with the necessary manipulations hereafter described. Distance "B" however, shall be equal to "A," since it is intended that the first turn of any layer shall be directly over the first turn of the preceding layer of wire turns. The paper insert shall have one tab 28 for each coil being wound, and the tabs on every insert sheet 27, shall be so spaced to coincide with the spacings between the coils wound. In practice such spacings would be equi-spaced.

Figure 8:
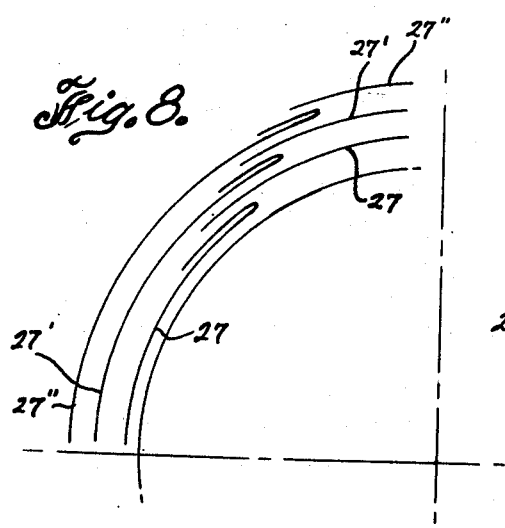
Fig. 8 is a diagrammatic end view of a coil of many layers, showing a preferred positioning of successive paper inserts to effect a coil structure of even thickness without "bumps." The wires are omitted to attain clarity of illustration.
Figure 7:
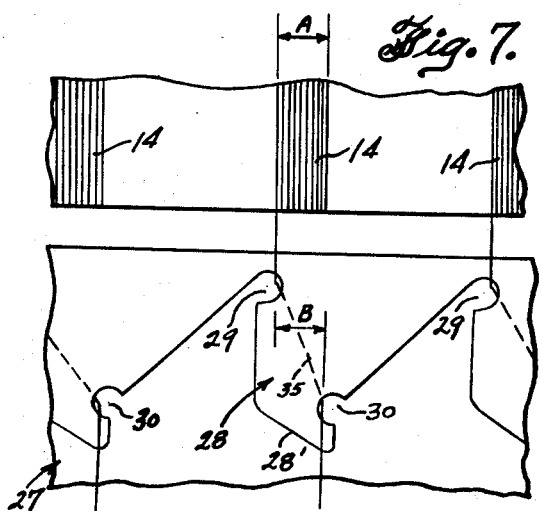
Fig. 7 is an enlarged portion of Fig. 5.

At the completion of each layer of turns, the machine is stopped. An insert 27 is set then as in Fig. 1, so that the wires being fed, are respectively between a pair of tabs 28. Now, each of these wires is set respectively under the tab 28 at its right, to become engaged in the related notches 29 and 30, and brought upwardly in the notch 30 to overlap the tab, as is illustrated in Fig. 5. The traverse guide 15 is now manually shifted to its initial position so that the wires taken onto the coils, shall lie perpendicular to the axis of the coils. The machine is now ready to wind the next layer of turns from right to left, and the first turn of this new layer will be directly over the first turn of the layer last wound. The insert 27 will be between the layers of coil windings mentioned, and it is to be noted that the wire portions 35 which lie under the tabs 28, and hence between said tabs and the body proper of the insert 27, will be insulated from both said layers. As a practical suggestion, the wires may be mounted onto the tabs 28, by the use of a tool designated by the numeral 31, held as shown in Fig. 3. This tool comprises a handled rod 32 having spaced hooks 33, for simultaneously engaging the respective wires to be mounted on the tabs 28. Also, it is advisable that the bottom of each tab 28, slope downwardly from left to right, to facilitate the mounting of the wires; such slope being shown at 28'. Also, the tabs of successive sheets shall be in advanced position of each other around the coil, as shown in Fig. 8, to yield a structure without bumps. This figure is an end view of a quarter of the coil, and the numerals 27, 27' and 27" and 27''' are identical, but successive inserts in the coil structure.

This invention is capable of various forms and numerous applications without departing from the essential features herein disclosed. It is therefore intended and desired that the embodiment shown herein shall be deemed illustrative and not restrictive, and that the patent shall cover all patentable novelty herein set forth; reference being had to the following claims rather than to the specific description herein to indicate the scope of this invention.

I claim:

1. The method for making an electric coil of the type built up of concentric helixes wound in the same direction, made by winding a continuous wire to form superimposed layers of turns; which consists of winding a layer of turns, then taking a paper-like sheet of insulative material and providing a tab thereon to hang from the region of its top edge, then forming a cut-in in each side edge of said tab so that the width of the longitudinal lane along the said tab between the inner ends of said cut-ins is equal to the length of the layer wound, then placing the sheet between the wire being fed and the coil, so that a side edge of the tab is adjacent said wire being fed, then placing the wire across the tab between the sheet and tab and within both cut-ins to position and secure the wire onto the tab, then placing the sheet so that the longitudinal edges of said lane on the tab are in alignment respectively with the first and last turns of the layer wound and then winding a second layer of turns onto the first layer in the same direction as the first layer was wound so that the tab and sheet are held between the layers.

2. An electric coil including two helixes made of a continuous wire wound to form superimposed layers of turns wound in the same direction; the first turns of said layers being at the same side of the coil; a comparatively short length of said wire lying across and between said layers and connecting the last turn of the first layer and the first turn of the second layer of turns, in combination with a paper-like sheet of insulative material positioned between said layers and having a tab hanging thereon whose side edges extending in the direction of the coil turns are respectively adjacent the ends of the coil and overlapping same; said tab being provided with a cut-in in each of said side edges thereof to an end of said layers respectively; said short length of wire being positioned between the tab and the sheet and in both said cut-ins to position and secure the wire onto the tab whereby the first turn of each layer is one over the other.

3. An article as defined in claim 2, wherein an edge of the sheet member is provided with a bent over portion and the tab is formed of such bent over portion; said edge extending across the direction of the coil turns.

LIONEL LORANT.

References Cited in the file of this patent

UNITED STATES PATENTS

| Number | Name | Date |
|---|---|---|
| 1,723,261 | Varley | Aug. 6, 1929 |
| 1,833,221 | Leidy | Nov. 24, 1931 |
| 2,122,894 | Sager | July 5, 1938 |

FOREIGN PATENTS

| Number | Country | Date |
|---|---|---|
| 22,922 | Austria | Feb. 10, 1906 |
| 356,960 | Great Britain | Sept. 17, 1931 |
| 357,651 | Great Britain | Oct. 1, 1931 |